US009994667B2

(12) United States Patent
Schlatter et al.

(10) Patent No.: US 9,994,667 B2
(45) Date of Patent: Jun. 12, 2018

(54) POLYTHIOURETHANE-BASED CASTING RESIN HAVING HIGH FRACTURE RESISTANCE AND LOW SPECIFIC WEIGHT

(71) Applicant: BRUNO BOCK CHEMISCHE FABRIK GMBH & CO. KG, Marschacht (DE)

(72) Inventors: Elvira Schlatter, Marschacht (DE); Detlef Schmidt, Marschacht (DE); Matthias Rehfeld, Marschacht (DE); Frank Ebmeyer, Marschacht (DE)

(73) Assignee: Bruno Bock Chemische Fabrik GmbH and Co. KG, Marschacht (DE)

( * ) Notice: Subject to any disclaimer, the term of this patent is extended or adjusted under 35 U.S.C. 154(b) by 0 days. days.

(21) Appl. No.: 14/888,778

(22) PCT Filed: Apr. 24, 2014

(86) PCT No.: PCT/EP2014/058323
§ 371 (c)(1),
(2) Date: Nov. 3, 2015

(87) PCT Pub. No.: WO2014/180666
PCT Pub. Date: Nov. 13, 2014

(65) Prior Publication Data
US 2016/0053044 A1    Feb. 25, 2016

(30) Foreign Application Priority Data
May 7, 2013   (EP) .................... 13166858

(51) Int. Cl.
C08G 18/00 (2006.01)
C08G 18/38 (2006.01)
C08G 18/72 (2006.01)
C08G 18/75 (2006.01)
G02B 1/04 (2006.01)

(52) U.S. Cl.
CPC ....... *C08G 18/3876* (2013.01); *C08G 18/722* (2013.01); *C08G 18/755* (2013.01); *C08G 18/757* (2013.01); *C08G 18/758* (2013.01); *G02B 1/041* (2013.01)

(58) Field of Classification Search
CPC .. C08G 18/3876; C08G 18/75; C08G 18/757; C08G 18/758
See application file for complete search history.

(56) References Cited

U.S. PATENT DOCUMENTS

| | | | |
|---|---|---|---|
| 4,689,387 A | 8/1987 | Kajimoto et al. | |
| 5,087,758 A * | 2/1992 | Kanemura | C07C 321/14 528/374 |
| 5,608,115 A * | 3/1997 | Okazaki | C07C 321/14 568/61 |
| 9,181,179 B2 | 11/2015 | Kawaguchi et al. | |
| 2009/0030170 A1* | 1/2009 | Ryu | C08G 18/3868 528/65 |
| 2009/0225425 A1 | 9/2009 | Jang et al. | |
| 2010/0029890 A1* | 2/2010 | Kawato | C08G 18/1875 528/53 |

FOREIGN PATENT DOCUMENTS

| | | | |
|---|---|---|---|
| EP | 378 895 | 7/1990 | |
| EP | 422 836 | 4/1991 | |
| EP | 0490778 | * 6/1992 | ............. C08G 18/38 |
| EP | 665 219 | 8/1995 | |
| EP | 676 428 | 10/1995 | |
| EP | 676 429 | 10/1995 | |
| EP | 1 448 651 | 4/2008 | |
| EP | 2 075 271 | 7/2009 | |
| EP | 2 246 378 | 11/2010 | |
| EP | 2 660 262 | 11/2013 | |
| JP | 07247335 A | * 9/1995 | ............. C08G 18/38 |
| JP | 10186101 A | * 7/1998 | |
| JP | 2006265408 A | * 10/2006 | |
| WO | WO 98/29766 | 7/1998 | |
| WO | WO 2008/092597 | 8/2008 | |
| WO | WO 2010/043392 | 4/2010 | |
| WO | WO 2011/144995 | 11/2011 | |
| WO | WO-2012091493 | * 7/2012 | ............. C08G 18/70 |

OTHER PUBLICATIONS

Document N_English Translation Sep. 2017.*
Document O_English Translation Sep. 2017.*
JP-2006265408-A_English Translation Oct. 2006.*
Written Opinion of the International Searching Authority, dated Nov. 7, 2015, issued in parent application PCT/EP2014/058323, 7 pages.

* cited by examiner

*Primary Examiner* — Michael L Leonard
(74) *Attorney, Agent, or Firm* — Nash and Titus, LLC

(57) ABSTRACT

The invention has as subject matter a method for producing a polyurethane cast resin, wherein the production comprises the steps of mixing at least one thiol component with at least one isocyanate component, degassing of the mixture and hardening of the polyurethane polymer in a one-stage process. Cast resins for electronic or optoelectronic components of for the production of optical lenses are obtained by the method of the invention that have good mechanical properties and very good optical properties at the same time by a suitable combination of polythiols as hardening component with commercially available isocyanates. The addition of special isocyanates is also not very necessary, as is the case for carrying out the method in several stages. The method in accordance with the invention results in an economical, one-stage process in the properties of the cast resin that are necessary for the application range.

8 Claims, No Drawings

POLYTHIOURETHANE-BASED CASTING RESIN HAVING HIGH FRACTURE RESISTANCE AND LOW SPECIFIC WEIGHT

The invention has as subject matter a method for producing polyurethane cast resin, wherein the production comprises the steps of mixing at least one thiol component with at least one isocyanate component, degassing of the mixture and hardening of the polyurethane polymer in a one-stage process.

There is an increasing requirement for polythiourethane masses with very good optical and mechanical properties for a number of applications, for example, as cast resins/cast masses for electronic or optoelectronic structural components or for the production of optical lenses. The production of cast masses based on polythiourethane with very good optical properties is basically known. It usually takes place by the conversion of isocyanate with polyols, polythiols and amines. The properties of the cast masses are usually optimized by using particular special compounds synthesized for this purpose, e. g., special isocyanates or thiols.

EP 378 895 B1 and EP 0 422 836 B1 describe such form masses and use special isocyanates such as, e. g., norbornane diisocyanate (NBDI) for obtaining good optical properties such as, e. g., a high refraction index and a low optical dispersion as well as a good thermostability. The latter are available in the market only to a very limited extent and not at commercially competitive prices.

US 2009/0225425 A1 describes cast masses that have a high impact resistance, in particular in the FDA Drop Ball test. The cast resins have, however, the disadvantage of a low refractive index that is not in the required area. Described cast resins with a higher refraction index in the required range do not have the required impact resistance according to the FDA Drop Ball test. Therefore, it is only possible with the described cast masses to optimize the optical properties at the expense of the impact resistance.

EP 1 448 651 B1 describes polymers with good optical properties as well as high impact resistance. This goal is achieved in that sulfur-containing pre-polymers of the oligourea type are produced and hardened with amines, polyols or polythiols. The sulfur-containing pre-polymers must be constructed on the basis of commercially available isocyanates, polythiols and amines in an expensive multi-stage synthesis.

The problem consists according to the invention in making available cast resins based on polythiourethane that do not have the previously cited disadvantages and in particular can be readily and economically produced, especially without the use of expensive or commercially unavailable special chemicals and that have a high impact resistance, a higher refraction index, a low optical dispersion and at the same time a low specific weight. Therefore, the cast resins in accordance with the invention should have good optical properties without this adversely affecting the impact resistance and the specific weight.

The problem is solved in accordance with the invention by a method for the production of a polyurethane cast resin, wherein the production takes place in a one-stage process and the steps comprise:
 a) Mixing at least one thiol component (A) with at least one isocyanate component (B),
 b) Degassing of the mixture and
 c) Hardening of the polyurethane polymer,
characterized in that
The thiol component (A) comprises at least one dithiol according to the formula (I)

$$HS-[CH_2CH_2-S]_x-CH_2CH_2-SH \qquad (I)$$

with x=0-5 and

The isocyanate component (B) is selected from the group consisting of isophorone diisocyanate, dicyclohexylmethane diisocyanate, hexamethylene diisocyanate, trimethylhexamethylene diisocyanate, α,α,α',α'-tetramethyl-xylylene diisocyanate, xylylene diisocyanate or a mixture of them.

Other embodiments constitute subject matter of the subclaims or are described in the following.

According to the invention one or more dithiols according to formula (I) are used as thiol component (A), especially preferably ethane-1,2-dithiol with x=0, 2,2 dimercapatodiethylsulfide with x=1, 1,11 dimercapto-3,6,9-trithiaundecane with x=5 or a mixture of them. The dithiol according to formula (I) is preferably contained from 5-50 wt %, especially preferably from 5 to 30 wt % in the mixture.

The use of high-refractive dithiols according to formula (I) with a refractive index 1.58 makes it possible in the method of the invention in an unexpected manner to replace other higher-functional polyols used in a very extensive manner without lowering the refractive index of the resulting cast resin. Therefore, the impact resistance can be very readily adjusted and at the same time a polymer (cast resin) with a low specific weight of ≤1.23 g/cm³ obtained.

In addition to one or more dithiols according to formula (I), the mixture contains one or more thiols of the group (I) consisting of pentaerythrithol-tetrakis-3-mercaptopropionate, pentaerythrithol-tetrakis-thioglycolate, trimethylolpropane-tris-3-mercaptopropionate, trimethylolpropane-tris-thioglycolate, pentaerythrithol-tetrakis-2-mercaptopropionate, trimethylolpropane-tris-2-mercaptopropionate, ditrimethylolpropane-tetrakis-3-mercaptopropionate, ditrimethylolpropane-tetrakis-thioglycolate, ditrimethylolpropane-tetrakis-2-mercaptopropionate, dipentaerythrithol-hexakis-3-mercaptopropionate, dipentaerythrithol-hexakis-thioglycolate, dipentaerythrithol-hexakis-2-mercaptopropionate, tris[3-mercaptopropionyloxy)-ethyl]-isocyanurate, tris[mercaptoethyloxy)-ethyl]-isocyanurate, tris[2-mercaptopropionyloxy)-ethyl]-isocyanurate, pentaerythrithol-tetrakis-4-mercaptobutyrate, trimethylolpropane-tris-4-mercaptobutyrate, trimethylolpropane-tris-4-mercaptobutyrate, pentaerythrithol-tetrakis-3-mercaptobutyrate, trimethylolpropane-tris-3-mercaptobutyrate, trimethylolpropane-tris-3-mercaptobutyrate, tris[3-mercaptobutyloxy)-ethyl]-isocyanurate, tris[4-mercaptobutyloxy)-ethyl]-isocyanurate and acetic acid, 2,2',2",2""-[1,2-ethane diylidene tetrakis(thio)]tetrakis-,tetrakis(2-mercaptoethyl) ester (CAS-number 144429-23-2) also known as 1,1,2,2-tertrakis(2-mercaptoethoxy-carbonylmethylthio)ethane, preferably pentaerythrithol-tetrakis-3-mercaptopropionate, pentaerythrithol-tetrakis-thioglycolate, trimethylolpropane-tris-3-mercaptopropionate, trimethylolpropane-tris-thioglycolate, ditrimethylolpropane-tetrakis-3-mercaptopropionates, dipentaerythrithol-hexakis-3-mercaptopropionate and acetic acid, 2,2',2",2""-[1,2-ethane diylidene tetrakis(thio)]tetrakis-,tetrakis(2-mercaptoethyl) ester, especially preferably pentaerythrithol-tetrakis-3-mercaptopropionate, trimethylolpropane-tris-3-mercaptopropionate and acetic acid, 2,2',2",2""-[1,2-ethane diylidene tetrakis(thio)]tetrakis-,tetrakis(2-mercaptoethyl) ester.

In this combination preferably ethane-1, 2-dithiol, 2,2'-dimercaptodiethyl sulfide, 1, 11-dimercapto-3, 6, 9-trithiaundecane or a mixture of them are used as dithiols with the formula (I).

In another embodiment in step (a) of the method of the invention one or more dithiols according to formula (I) are used in combination with one or more thiols of the group (II) consisting of 4-mercaptomethyl-1,8-dimercapto-3,6-dithiaoctane, 4,8-dimercapatomethyl-1,11-dimercapto-3,6,9-trithiaundecane, tetrakis(mercaptomethyl)methane, 1,1,3,3,-tetrakis(mercaptomethylthio)propane, 1,1,5,5-tetrakis(mercaptomethylthio)-3-thiapentane, 1,1,6,6-tetrakis(mercaptomethylthio)-3,4-dithiahexane, 2,2-bis(mercaptomethyl)-1,3-propanedithiol, bis(mercaptomethyl) sulfide, bis(mercaptopropyl)sulfide, bis(mercaptomethylthio)methane, tris(mercaptomethylthio)methane, 1,2,3-tris(mercaptomethylthio) propane, 1,2,3-tris(mercaptoethylthio)propane, tetrakis(mercaptomethylthio)methane, tetrakis(mercaptoethylthiomethyl)methane, tetrakis(mercaptopropylthiomethyl)methane, 2,5-dimercapato-1,4-dithiane, 2,5-bismercaptomethyl-1,4-dithiane as a thiol component (A).

In this embodiment preferably 4-mercaptomethyl-3,6-dithia-1,8-octandithiol, 5,7-dimercapatomethyl-1,11-dimercapto-3,6,9-trithiaundecane, 4,7-dimercapatomethyl-1,11-dimercapto-3,6,9-trithiaundecane, 4,8-dimercapatomethyl-1,11-dimercapto-3,6,9-trithiaundecane and mixtures of them are used as a component of the thiol component A in addition to the dithiol of formula I as one or more thiols of the group (II), and 4-mercaptomethyl-3,6-dithia-1,8-octandithiol is especially preferred. Ethane-1,2-dithiol, 2,2'-dimercapatodiethylsulfide, 1,11-dimercapato-3,6,9-trithiaundecane or a mixture of them are preferably used as dithiols of the formula I in this combination.

In another embodiment in step (a) of the method of the invention one or more dithiols according to formula (I) in combination with one or more thiols of the group (I) in one or more thiols of the group (II) are used as thiol component (A).

One or more dithiols according to formula (I) in combination with one or more thiols of the groups (I) and/or (II) are especially preferably used in step (a) of the method of the invention as thiol component (A). Especially suitable mixtures that are used are those containing the thiols 4-mercaptomethyl-3,6-dithia-1,8-octandithiol, 5,7-dimercapatomethyl-1,11-dimercapto-3,6,9-trithiaundecane, 4,7-dimercapatomethyl-1,11-dimercapto-3,6,9-trithiaundecane, 4,8-dimercapatomethyl-1,11-dimercapto-3,6,9-trithiaundecane, pentaerythrithol-tetrakis-3-mercaptopropionate, trimethylolpropane-tris-3-mercaptopropionate, ditrimethylolpropane-tetrakis-2-mercaptopropionate, dipentaerythrithol-hexakis-3-mercaptopropionate, 1,1,2,2-tertrakis(2-mercaptoethoxycarbonylmethylthio)ethane, ethane-1,2-diol, 2,2'-dimercapatodiethylsulfide 1,11-dimercapato-3,6,9-trithiaundecane or their mixtures.

A mixture with the following composition is preferably used in step a):
  5-50 wt %, preferably 5-30 wt % of a thiol component (A) according to formula (I)
  0-50 wt %, preferably 15-45 wt % of one or more thiols of the groups (I) and/or (II and
  30-70 wt % of an isocyanate component (B).

A mixture with the following composition is preferably used in step a):
  5-30 wt % of one or more thiol components (A) according to formula (I) selected from the group consisting of ethane-1,2-dithiol, 2,2'-dimercaptodiethyl sulfide, 1,11-dimercapato-3,6,9-triiaundecane
  15-45 wt % of one or more thiols of the group (I) and/or (II) selected from the group consisting of 4-mercaptomethyl-3,6-dithia-1,8-octandithiol, 5,7-dimercapatomethyl-1,11-dimercapto-3,6,9-trithiaundecane, 4,7-dimercapatomethyl-1,11-dimercapto-3,6,9-trithiaundecane, 4,8-dimercapato-methyl-1,11-dimercapto-3,6,9-trithiaundecane, pentaerythrithol-tetrakis-3-mercaptopropionate, trimethylolpropane-tris-3-mercaptopropionate, ditrimethylolpropane-tetrakis-2-mercaptopropionate, dipentaerythrithol-hexakis-3-mercaptopropionate, acetic acid, 2,2',2'',2''''-[1,2-ethanediylidenetetrakis(thio)]tetrakis-,tetrakis(2-mercaptoethyl) ester (CAS number 144429-23-2)
  30-70 wt % of the isocyanate component (B) consisting of one or of a mixture of several isocyanates from the group of isophorone diisocyanate, dicyclohexylmethanediisocyanate, hexamethylene diisocyanate, trimethylhexamethylene diisocyanate, toluene diisocyanate, $\alpha,\alpha,\alpha',\alpha'$-tetramethyl-xylylene diisocyanate, xylylene diisocyanate.

In order to increase the impact resistance, dithiols according to group (III) can be used that consist of glycoldimercaptoacetate, glycol-di-3-mercaptopropionate, diethylene glycoldimercaptoacetate, diethylene glycol-di-3-mercaptopropionate, triethylene glycoldimercaptopropionate, triethylene glycol-di-3-mercaptopropionate, Propylene glycoldimercaptoacetate, propylene glycol-di-3-mercaptopropionate, dipropylene glycoldimercaptoacetate, dipropylene glycol-di-3-mercaptopropionate, tripropylene glycoldimercaptopropionate, tripropylene glycol-di-3-mercaptopropionate.

However, since these compounds all have a refraction index $n_D<1.54$ and only slightly elevate the impact resistance of the polymer form body, their use for form masses with a refraction index of $n_D \geq 1.60$ is possible only to a very limited extent. Reference example 4 illustrates this.

The suitable combination of thiols preferably contains special aliphatic dithiol components with a high refraction index. This significantly improves the impact resistance and the refraction index of the cast resin remains high.

The isocyanate component (B) is preferably a diisocyanate selected from the group consisting of isophorone diisocyanate, dicyclohexylmethane diisocyanate, hexamethylene diisocyanate, trimethylhexamethylene diisocyanate, $\alpha,\alpha,\alpha',\alpha'$-tetramethyl-xylylene diisocyanate, xylylene diisocyanate or a mixture of them. The isocyanate component isophorone diisocyanate, hexamethylene diisocyanate, dicyclohexylmethane diisocyanate or a mixture of them is especially preferred. The polyurethane cast resin especially preferably contains only the previously cited isocyanates.

The cast resins with a polyurethane base produced with the method of the invention have a refraction index of $n_D \geq 1.60$, determined with an Abbe refractometer, an Abbe number of $\geq 38$, determined with an Abbe refractometer, and a heat deflection temperature Tg$\geq 100°$ C., determined by dynamic differential calorimetry (DSC). Surprisingly, the cast resin produced with the method of the invention has at the same time a high impact resistance in the Drop Ball test (FDA Drop Ball test with a 16 g ball and a fall height of 127 cm and an expanded test with a 67 g ball and a fall height of 127 cm) and a low density $\leq 1.23$ g/cm$^3$.

Description of the Methods:
Determination of the glass transition temperature (Tg) of the polymers is a measure for the heat deflection temperature:

The determination of the glass transition temperature takes place with the aid of dynamic differential calorimetry (differential scanning calorimetry, DSC). The determination of the Tg values takes place in the special instance with the DSC 1 device from Mettler-Toledo. The STARe software is used in the version 10.00c. The polymer sample is first deleted from 40° C. to 145° C. with a heating rate of 10 K/min and maintained at this temperature for 8 min. The sample is cool down with −30K/min to 45° C. and then heated with a heating rate of 10 K/min to 155° C. The determination of the class transition temperature takes place on the basis of the 2nd heating curve.

Determination of the Abbe Number

Abbe numbers are determined with a digital multi-wave refractometer from the SCHMMIDT+HAENSCH company of the type DSR-λ at 20° C. The samples are ground and polished beforehand. The Abbe value is then calculated according to the formula $$\text{Abbé number} = (n_D - 1)/(n_F - n_C)$$

with $n_D$—refractive power at 589.3 nm
$n_F$—refractive power at 486.1 nm
$n_C$—refractive power at 656.3 nm Determination of the Refraction Index Refraction indices (n) are determined with the digital refractometer of the company Dr. Kernchen of the Abbemat type at a wavelength of 589.3 nm (sodium D line) and at a temperature of 20° C.

The determination of the density of the solid polymers takes place on the basis of the Archimedean principle with the aid of an analytical balance. In particular, a Mettler-Toledo Excellence analytical balance of the XS205 dual range type is used, equipped with the density determination kit for this balance. The measuring takes place at 21° C.

The evaluation of the color of the form bodies takes place visually in front of a white sheet of paper that is used as background.

The evaluation of the transparency of the form bodies takes place visually by observing a form body in the transmitted light.

A BPI Drop Ball tester is used for the tests for the impact resistance. The FDA Drop Ball test is carried out with this device on 20 test bodies (castings) (weight of the steel balls: 16 g height of fall: 127 cm) and an expanded test (weight of the steel ball: 67 g:67 g height of fall: 127 cm). The expanded test is considered as passed if >70% of the test pieces survive it undamaged.

Surprisingly, the very good mechanical properties are achieved with very good optical properties at the same time by a suitable combination of polythiols as hardening component, and of commercially available isocyanates. The addition of special isocyanates is also not very necessary, as is the case for carrying out the method in several stages. The method in accordance with the invention results in an economical, one-stage process to the desired properties of the cast resin.

The cast resins (cast masses) produced with the method of the invention on the basis of polythiourethane are suitable for electronic or optoelectronic components and the production of optical lenses. They are distinguished by a high impact resistance, a low density and very good optical and mechanical properties, such as are required for castings of different shapes and applications. In order that a cast resin can be used to produce optical lenses, it is always necessary that the refraction index and the Abbe number as well as the transmission achieve certain values. If these values are not achieved, the cast resin is not suitable for the application range.

The lower density of the material produced in accordance with the invention has the advantage that the finished optical lenses have less weight than lenses of material with a higher density. As a result, the lenses are more economical because this material needs to be used for the same lens size and they are lighter, which increases the wearing comfort for eyeglasses. At the same time, a cast resin must have a certain impact resistance for optical lenses. Without the demonstration of a certain impact resistance, a corresponding material, especially in the USA, cannot be used at all for optical lenses.

The method in accordance with the invention is one-stage and takes place simply by mixing the components, degassing the mixture and hardening of the polymer. A multi-stage process that requires the synthesis of an intermediate stage, e.g., in the form of a pre-polymer is not necessary. The hardening of the formulation takes place for the customary catalysts used for the hardening of polythiourethane polymers. The following can be used, e.g., as catalysts in the method of the invention: dibutyl stannous dichloride, dibutyl stannous dilaurate and amines such as DABCO, trialkylamines and nitrogen heterocycles such as pyridine- and imidazole derivatives.

The invention is explained in detail using the following examples.

EXAMPLE 1

44.4 g isophorone diisocyanate, 11.1 g hexamethylene diisocyanate, 28.3 g 4-mercaptomethyl-3,6-dithia-1,8-octandithiol, 16.2 g dimercaptodiethylsulfide and 0.5 g dibutyl stannous dilaurate were mixed, homogenized and degassed in a vacuum. The mixture was then placed in aluminum forms and hardened 20 hours at 120° C.

A transparent, colorless form body with the properties cited in table 1 were obtained. The form body passed the Drop Ball test according to the FDA and the expanded test with a 67 g ball.

EXAMPLE 2

57.3 g dicyclohexylmethanediisocyanate, 35.0 g 4-mercaptomethyl-3,6-dithia-1,8-octandithiol, 7.7 g dimercaptodiethylsulfide and 0.05 g dimorpholinyldiethylether were mixed, homogenized and degassed in a vacuum. The mixture was then placed in aluminum forms and hardened 20 hours at 120° C.

A transparent, colorless form body with the properties cited in table 1 was obtained. The form body passed the Drop Ball test according to the FDA and the expanded test with a 67 g ball.

EXAMPLE 3

54.1 g isophorone diisocyanate, 28.7 g 4-mercaptomethyl-3,6-dithia-1,8-octandithiol, 17.1 g dimercaptodiethylsulfide and 0.05 g dimorpholinyldiethylether were mixed, homogenized and degassed in a vacuum. The mixture was then placed in aluminum forms and hardened 20 hours at 120° C.

A transparent, colorless form body with the properties cited in table 1 was obtained. The form body passed the Drop Ball test according to the FDA and the expanded test with a 67 g ball.

EXAMPLE 4

44.4 g isophorone diisocyanate, 11.1 hexamethylene diisocyanate, 28.3 g 4-mercaptomethyl-3,6-dithia-1,8-octane dithiol, 16.2 g dimercapatodiethylsulfide and 0.05 g dimorpholinyldiethylether were mixed, homogenized and degassed in a vacuum. The mixture was then placed in aluminum forms and hardened 20 hours at 120° C.

A transparent, colorless form body with the properties cited in table 1 was obtained. The form body passed the Drop Ball test according to the FDA and the expanded test with a 67 g ball.

EXAMPLE 5

35.9 g isophorone diisocyanate, 11.1 hexamethylene diisocyanate, 10.0 g dicyclohexylmethane diisocyanate, 27.6 g 4-mercaptomethyl-3,6-dithia-1,8-octandithiol, 15.8 g dimercaptodiethylsulfide, 4.2 g acetic acid, 2,2',2'',2'''-[1,2-ethane diylidene-tetrakis-(thio)]tetrakis-,tetrakis(2-mercaptoethyl)ester and 0.1 g dibutyl stannous dichloride were mixed, homogenized and degassed in a vacuum. The mixture was then placed in aluminum forms and hardened 20 hours at 120° C.

A transparent, colorless form body with the properties cited in table 1 was obtained. The form body passed the Drop Ball test according to the FDA and the expanded test with a 67 g ball.

TABLE 1

Recipes and properties of the cast resins produced (in accordance with the invention) according to examples 1-5.

|  | 1 | 2 | 3 | 4 | 5 |
|---|---|---|---|---|---|
| Isophorone diisocyanate | 44.4 g |  | 54.1 g | 44.4 g | 35.9 g |
| Hexamethylene diisocyanate | 11.1 g |  |  | 11.1 g | 11.1 g |
| Dicyclohexylmethane diisocyanate |  | 57.3 g |  |  | 10.0 g |
| 4-mercaptomethyl-3,6-dithia-1,8-octandithiol | 28.3 g | 35.0 g | 28.7 g | 28.3 g | 27.6 g |
| dimercaptodiethylsulfide | 16.2 g | 7.7 g | 17.1 g | 16.2 g | 15.8 g |
| Acetic acid 2,2',2'',2'''-[1,2-ethane diylidene-tetrakis-(thio)]tetrakis-,tetrakis(2-mercaptoethyl)-ester |  |  |  |  | 4.2 g |
| Dimorpholinyldiethylether |  | 0.05 g | 0.05 g | 0.05 g |  |
| Dibutyl stannous dilaureate | 0.5 g |  |  |  | 0.5 g |
| $n_D$ | 1.60 g | 1.60 g | 1.60 g | 1.60 g | 1.60 g |
| Abbe number | 39 | 40 | 38 | 39 | 39 |
| Tg [° C.] | 110 | 113 | 114 | 115 | 105 |
| Density g/cm$^3$] | 1.23 | 1.23 | 1.23 | 1.23 | 1.23 |

REFERENCE EXAMPLE 1

43.0 g isophorone diisocyanate, 10.8 g hexamethylene diisocyanate, 45.8 g 4-mercaptomethyl-3,6-dithia-1,8-octandithiol, and 0.5 g dibutyl stannous dilaurate were mixed, homogenized and degassed in a vacuum. The mixture was then placed in aluminum forms and hardened 20 hours at 120° C.

A transparent, colorless form body was obtained. The form body passed the Drop Ball test according to the FDA but did not pass the expanded test with a 67 g ball.

REFERENCE EXAMPLE 2

55.6 g isophorone diisocyanate, 44.4 g 4-mercaptomethyl-3,6-dithia-1,8-octandithio and 0.5 g dibutyl stannous dilaurate were mixed, homogenized and degassed in a vacuum.

The mixture was then placed in aluminum forms and hardened 20 hours at 120° C.

A transparent, colorless form body was obtained. The form body did not pass the Drop Ball test according to the FDA or the expanded test with a 67 g ball.

REFERENCE EXAMPLE 3

50.0 g norbornane diisocyanate, 25.0 g 4-mercaptomethyl-3,6-dithia-1,8-octandithiol, 25.0 g pentaerythritholtetrakis-3-mercaptopropionate and 0.5 g dibutyl stannous dilaurate were mixed, homogenized and degassed in a vacuum. The mixture was then placed in aluminum forms and hardened 20 hours at 120° C.

A transparent, colorless form body was obtained. The form body passed the Drop Ball test according to the FDA but the expanded test with a 67 g ball was not passed.

REFERENCE EXAMPLE 4

56.0 g dicyclohexylmethane diisocyanate, 40.0 g 4-mercaptomethyl-3,6-dithia-1,8-octandithiol, 4.0 g glykol-bis-2-mercaptopropionate and 0.5 g dibutyl stannous dilaurate were mixed, homogenized and degassed in a vacuum. The mixture was then placed in aluminum forms and hardened 20 hours at 120° C.

A transparent, colorless form body was obtained. The form body passed the Drop Ball test according to the FDA but did not pass the expanded test with a 67 g ball.

TABLE 2

Recipes and properties of the cast resins produced (not in accordance with the invention) according to reference examples 1-4.

|  | V1 | V2 | V3 | V4 |
|---|---|---|---|---|
| Norbornane diisocyanate |  |  | 50.0 g |  |
| Isophorone diisocyanate | 43.0 g | 55.6 g |  |  |
| Hexamethylene diisocyanate | 10.8 g |  |  |  |
| Dicyclohexylmethane diisocyanate |  |  |  | 56.0 g |
| 4-mercaptomethyl-3,6-dithia-1,8-octandithiol | 45.8 g | 44.4 g | 25.0 g | 40.0 g |
| Pentaerythrithol-tetrakis-3-mercaptopropionate |  |  | 25.0 g |  |
| Glycol-bis-2-mercaptopropionate |  |  |  | 4.0 g |
| dimercaptodiethylsulfide |  |  |  |  |
| Acetic acid 2,2',2'',2'''-[1,2-ethane diylidene-tetrakis-(thio)]tetrakis-,tetrakis(2-mercaptoethyl)ester |  |  |  |  |
| Dibutyl stannous dilaureate | 0.5 g | 0.5 g | 0.5 g | 0.5 g |
| $n_d$ | 1.61 | 1.60 g | 1.60 g | 1.59 g |
| Abbe number | 39 | 42 | 41 | 41 |
| Tg [° C.] | 109 | 105 | 116 | 107 |
| density [g/cm$^3$] | 1.25 g | 1.23 | 1.30 | 1.23 |

The measuring of the refraction index, the Abbe number, heat deflection temperature Tg and of the density took place with the methods cited in the specification.

The invention claimed is:
1. A method for the production of a polyurethane cast resin, wherein the production takes place in a one-stage process and the steps comprise:
   a) Mixing 5-30 wt % of at least one thiol component (A) selected from the group consisting of ethane-1,2-dithiol, 2,2'-dimercaptodiethyl sulfide, and 1,11-dimercapto-3,6,9-trithiaundecane, 15-45 wt % of one or more thiols of the group (I) and/or group (II), and 30-70 wt % of at least one isocyanate component (B),
a) Degassing of the mixture and
b) Hardening of the polyurethane polymer,
wherein thiols of group (I) are selected from the group consisting of pentaerythrithol-tetrakis-3-mercaptopropionate, pentaerythrithol-tetrakis-thioglycolate, trimethylolpropane-tris-3-mercaptopropionate, trimethylolpropane-tris-thioglycolate, pentaerythrithol-tetrakis-2-mercaptopropionate, trimethylolpropane-tris-2-mercaptopropionate, ditrimethylolpropane-tetrakis-3-mercaptopropionate, ditrimethylolpropane-tetrakis-thioglycolate, ditrimethylolpropane-tetrakis-2-mercaptopropionate, dipentaerythrithol-hexakis-3-mercaptopropionate, dipentaerythrithol-hexakis-thioglycolate, dipentaerythrithol-hexakis-2-mercaptopropionate, tris[3-mercaptopropionyloxy)-ethyl]-isocyanurate, tris[mercaptoethyloxy)-ethyl]-isocyanurate, tris[2-mercaptopropionyloxy)-ethyl]-isocyanurate, pentaerythrithol-tetrakis-4-mercaptobutyrate, trimethylolpropane-tris-4-mercaptobutyrate, trimethylolpropane-tris-4-mercaptobutyrate, pentaerythrithol-tetrakis-3-mercaptobutyrate, trimethylolpropane-tris-3-mercaptobutyrate, trimethylolpropane-tris-3-mercaptobutyrate, tris[3-mercaptobutyloxy)-ethyl]-isocyanurate, tris[4-mercaptobutyloxy)-ethyl]-isocyanurate and acetic acid, 2,2',2'',2'''-[1,2-ethane diylidene tetrakis(thio)]tetrakis-,tetrakis(2-mercaptoethyl) ester,
and wherein thiols of group (II) are selected from the group consisting of 4-mercaptothiolmethyl-1,8-dimercapto-3,6-dithiaoctane, 4,8-dimercapatomethyl-1,11-dimercapto-3,6,9-trithiaundecane, tetrakis(mercaptomethyl)methane, 1,1,3,3,-tetrakis (mercaptomethylthio)propane, 1,1,5,5-tetrakis (mercaptomethylthio)-3-thiapentane, 1,1,6,6-tetrakis (mercaptomethylthio)-3,4-dithiahexane, 2,2-bis (mercaptomethyl)-1,3-propanedithiol, bis (mercaptomethyl)sulfide, bis(mercaptopropyl)sulfide, bis(mercaptomethylthio)methane, tris(mercaptomethylthio)methane, 1,2,3-tris(mercaptomethylthio)propane, 1,2,3-tris(mercaptoethylthio)propane, tetrakis (mercaptomethylthio)methane, tetrakis (mercaptoethylthiomethyl)methane, tetrakis (mercaptopropylthiomethyl)methane, and 2,5-dimercapato-1,4-dithian, 2,5-Bismercaptomethyl-1,4-dithiane, and
wherein the only isocyanate component (B) present consists of, dicyclohexylmethane diisocyanate, hexamethylene diisocyanate, trimethylhexamethylene diisocyanate, α.α,α',α'-tetramethyl-xylylene diisocyanate, xylylene diisocyanate or a mixture of them,
and wherein the polyurethane cast resin has a high impact resistance in the Drop Ball test, measured with the FDA Drop Ball test with a 16 g ball and a fall height of 127 cm and an expanded test with a 67 g ball and a fall height of 127 cm), and a density ≤1.23 g/cm$^3$.

2. The method according to claim 1, characterized in that thiol component (A) comprises one or more thiols of the group (I) selected from the group consisting of pentaerythrithol-tetrakis-3-mercaptopropionate, pentaerythrithol-tetrakis-thioglycolate, trimethylolpropane-tris-3-mercaptopropionate, trimethylolpropane-tris-thioglycolate, ditrimethylolpropane-tetrakis-2-mercaptopropionate, dipentaerythrithol-hexakis-3-mercaptopropionate and acetic acid, 2,2',2'',2'''-[1,2-ethane diylidene tetrakis(thio)]tetrakis-,tetrakis(2-mercaptoethyl) ester.

3. The method according to claim 1, characterized in that thiol component (A) comprises one or more thiols of the group (I) selected from the group consisting of pentaerythrithol-tetrakis-3-mercaptopropionate, trimethylolpropane-tris-3-mercaptopropionate and acetic acid, 2,2',2'',2'''-[1,2-ethane diylidene tetrakis(thio)]tetrakis-,tetrakis(2-mercaptoethyl) ester.

4. The method according to claim 1, characterized in that thiol component (A) further comprises one or more thiols, selected from the group consisting of 4-mercaptomethyl-3,6-dithia-1,8-octandithiol, 5,7-dimercapatomethyl-1,11-dimercapto-3,6,9-trithiaundecane, 4,7-dimercapatomethyl-1,11-dimercapto-3,6,9-trithiaundecane, 4,8-dimercapatomethyl-1,11-dimercapto-3,6,9-trithiaundecane and their mixtures.

5. The method according to claim 1, characterized in that thiol component (A) further comprises 4-mercaptomethyl-3,6-dithia-1,8-octandithiol.

6. The method according to claim 1, characterized in that the isocyanate component (B) is one or more diisocyanate(s) selected from the group consisting of isophorone diisocyanate, dicyclohexylmethane diisocyanate, hexamethylene diisocyanate, trimethylhexamethylene diisocyanate, α.α,α',α'-tetramethyl-xylylene diisocyanate, xylylene diisocyanate and mixtures thereof, and that the polyurethane cast resin does not contain any other isocyanates.

7. The method according to claim 1, characterized in that the polyurethane cast resin has a refraction index of $n_D$≥1.60, determined with an Abbe refractometer, and an Abbe number of ≥38, determined with an Abbe refractometer.

8. The method according to claim 1, wherein thiol of the group (I) is acetic acid 2,2',2'',2'''-[1,2-ethane diylidene tetrakis(thio)]tetrakis-,tetrakis(2-mercaptoethyl) ester, and the thiol of group (II) is 4-mercaptothiolmethyl-1,8-dimercapto-3,6-dithiaoctane.

* * * * *